C. H. KICKLIGHTER.
METHOD OF JOINING METALS BY ELECTRIC WELDING.
APPLICATION FILED OCT. 27, 1919.

1,340,170.

Patented May 18, 1920.

Inventor
Charles. H. Kicklighter

C. H. KICKLIGHTER.
METHOD OF JOINING METALS BY ELECTRIC WELDING.
APPLICATION FILED OCT. 27, 1919.

1,340,170.

Patented May 18, 1920.

Inventor

Charles H. Kicklighter.

UNITED STATES PATENT OFFICE.

CHARLES H. KICKLIGHTER, OF MACON, GEORGIA.

METHOD OF JOINING METALS BY ELECTRIC WELDING.

1,340,170.

Specification of Letters Patent. Patented May 18, 1920.

Application filed October 27, 1919. Serial No. 333,611.

*To all whom it may concern:*

Be it known that I, CHARLES H. KICK-LIGHTER, a citizen of the United States, and a resident of Macon, in the county of Bibb and State of Georgia, have invented new and useful Improvements in the Methods of Joining Metals by Electric Welding, of which the following is a specification.

The invention relates to a method of joining two pieces of metal by the use of electric heating current and mechanical pressure, in which case the heating current and pressure are first employed to raise an elevated area with an approximately plane surface upon one piece of metal and subsequently the heating current and pressure are employed to weld another piece of metal to this elevated surface and to force the two pieces of metal into immediate contact about the position of the weld.

The object of the invention is to afford an easy, simple and practical method of fastening plates or similar pieces of metal by the electric welding process. It has been found that when it is attempted to weld thick plates by the plain spot welding method, a tremendous pressure is necessary to overcome the irregularities and rigidity of the cold plates and to force them into firm contact between the welding terminal. Also a very large current is required to do the welding, as this current spreads out considerably and much heat is dissipated and causes distortion troubles.

The method herein described is to first soften a spot in one of the plates by passing therethrough electric heating current, then by the application of a die under pressure to the softened spot to raise from the original plate surface an elevated area with a substantially plane surface and surrounded by a depressed area from which the metal is raised. After this the process is continued by the passage of welding electric current so as to weld another plate to this elevated area and to force the elevated metal back into the surrounding depression from which it was originally raised and thus to allow the surrounding surfaces of the plates to come into immediate contact.

By this method, the pressure required is not great and the amount of heating current is relatively small, as the heating is limited to the immediate position of the weld. A light and portable machine can in this way be utilized to make welds between large and thick plates of metal.

Another advantage is that the elevated metal, at the time of the welding operation, will be forced back into and will just completely fill the depression from which it was originally forced so that the surrounding surfaces of the plates come into immediate contact and no void is left. The object of previously heating the spots is that the metal is more plastic and can be forced up into the die against the plane bottom thereof so as to give a plane elevated surface. A plane surface of contact gives by far the best results,—as all points of this surface are brought to a welding heat at about the same instant and a thorough fusion of the metal at all points is obtained by the time the elevated metal is softened sufficiently to be forced down into the surrounding depression.

A plurality of welds at spots properly staggered makes an effective seam or joint between thick plates of metal. Or continuous welds may be made by this method along paths parallel to the edges of the plates being joined.

Fig. 4 is a sketch illustrating the preliminary heating at position A of Fig. 3.

Fig. 5 is a sketch illustrating the raising of the softened metal by a roller-die at position B of Fig. 3.

Fig. 6 is a sketch illustrating in cross view the raised path of metal at position C of Fig. 3.

Fig. 7 is a sketch illustrating the welding of another piece of metal to the elevated surface at position D of Fig. 3.

Fig. 8 is a sketch illustrating a completed weld at position E of Fig. 3.

Figure 1:
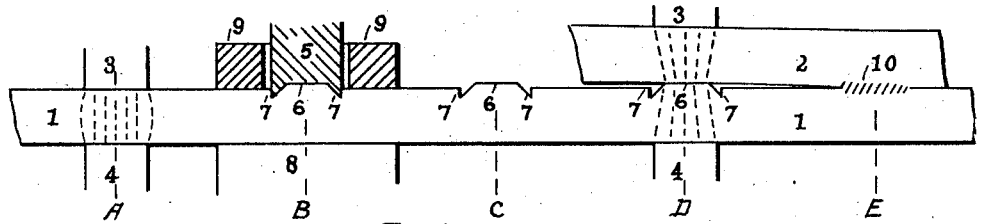
Figure 1 is a diagrammatic sketch, partially sectioned, showing one application of the invention and illustrating the several steps in the operation.
Figure 2:
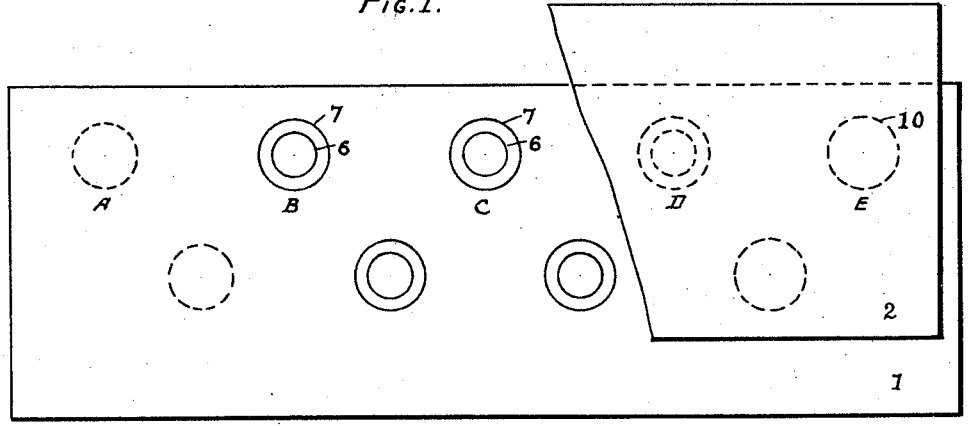
Fig. 2 is a top view of the plates in Fig. 1.
Figure 3:
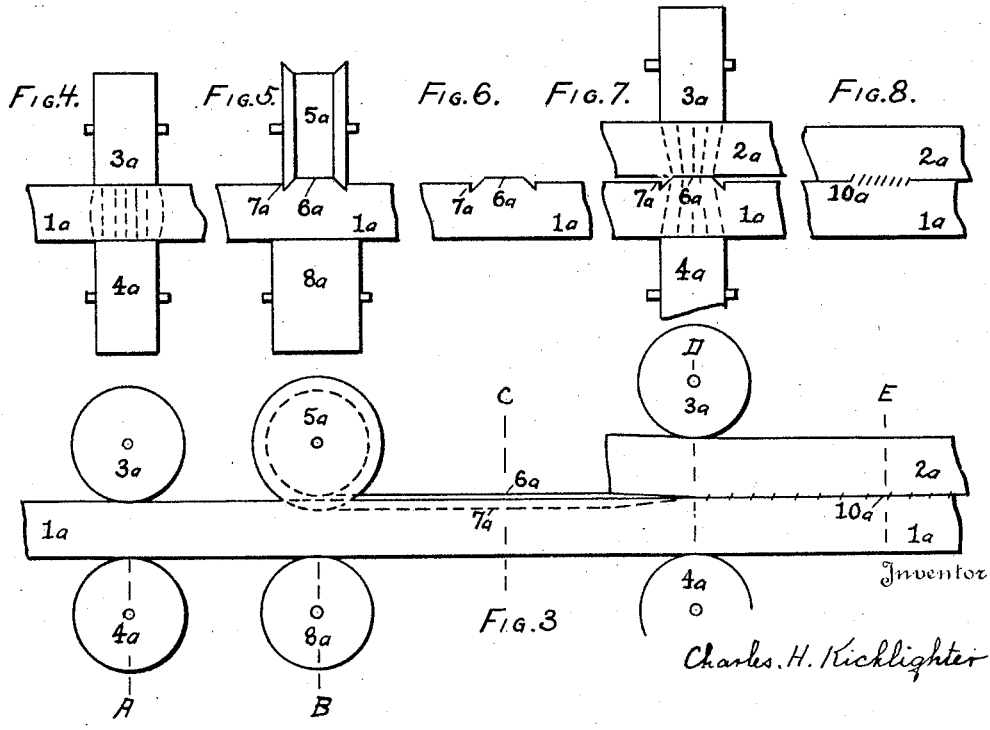
Fig. 3 is a diagrammatic sketch, partially sectioned, showing another application of the invention in which the welding is being made continuous along a path parallel to the plate edges.

Referring to Figs. 1 and 2, the plates or pieces of metal 1 and 2 are to be fastened together. At position A the terminals 3 and 4 of an electric welding or heating machine are being applied so as to heat the metal of plate 1 immediately between these terminals. At position B a die 5 is being forced downward into the previously heated spot of the metal plate so as to form an elevated surface of metal therefrom at 6 and a surrounding depression therein at 7. The softened metal is readily forced up against the flat bottom of the die at 6. Pressure between the anvil 8 below and the annular collar 9—9 above prevents the metal being forced out in other directions. At position C the elevated surface 6 and surrounding depression 7 are illustrated after the removal of the die. At position D the plate 2 is being welded to the elevated surface 6 of plate 1 by the passage of welding current between terminals 3 and 4 of the same or another welding machine. The pressure is forcing the elevated material into the surrounding depression. At position E the plates have been welded along the area 10.

Referring now to Figs. 3, 4, 5, 6, 7, 8, 9 and 10, the plates or pieces of metal $1^a$ and $2^a$ are to be fastened together. At position A the roller-terminals $3^a$ and $4^a$ of an electric welding or heating machine are being applied to heat a narrow path of metal as it passes between these terminals. At position B a roller-die $5^a$ is being forced downward into the previously heated path of metal so as to form an elevated surface of metal therefrom at $6^a$ and adjacent depressions therein at $7^a$. The softened metal is readily forced up against the flat bottom of the groove in the roller die so as to give a substantially flat surface at $6^a$. At position C the elevated surface $6^a$ and the depressed surfaces $7^a$ are illustrated after the passage of the roller-die. At position D the plate $2^a$ is being welded to the elevated surface $6^a$ of plate $1^a$ by the passage of welding current between terminals $3^a$ and $4^a$ of the same or of another welding machine. The pressure is forcing the elevated material into the adjacent depressions. At position E the plates have been welded along the area $10^a$.

Figures 9, 10:
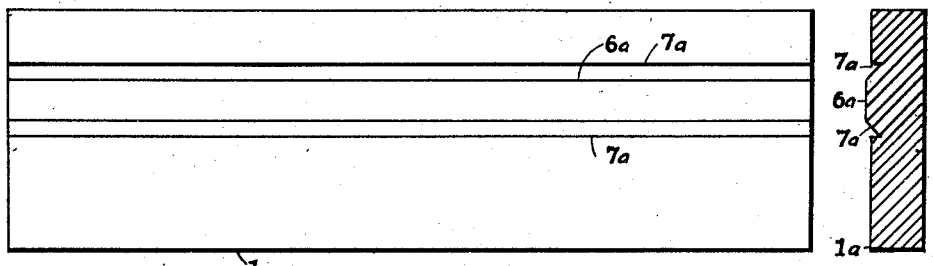
Fig. 9 is a top view of a plate of metal with a continuous path of raised metal before the operation is completed.
Fig. 10 is a cross section through the plate of Fig. 9.

Figs. 9 and 10 illustrate an elevated surface $6^a$ and adjacent depressions $7^a$—$7^a$ along a path parallel to the edges of the plate $1^a$.

Figure 11:
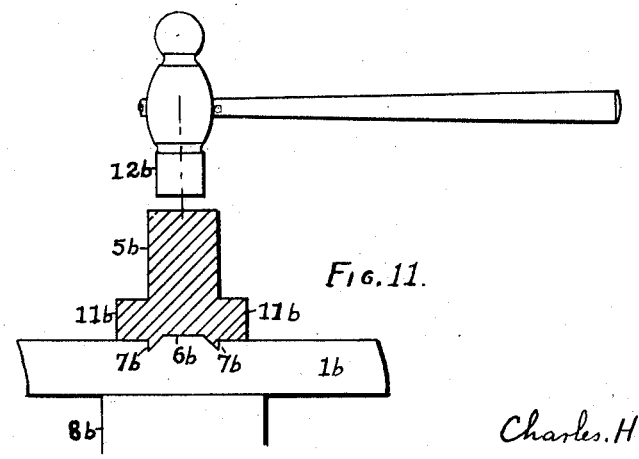
Fig. 11 is a sketch illustrating a die being forced upon the surface of a plate by blows from a machinist's hammer.

Various modifications at once suggest themselves which fall within the spirit of this invention. For instance, the preliminary heating of a spot or path of metal in the plate may be done by the oxy-acetylene flame. Again the die may be a simple tool which is forced down into the plate by blows from a hammer. Fig. 11 illustrates such a die $6^b$ being forced into a plate by $1^b$ by blows from a hammer $12^b$. The cutting projections $7^b$ are forcing the previously heated and softened material up against the flat surface $6^b$ of the die. The die is driven downward until the shoulders $11^b$—$11^b$ come against the plate $1^b$ thus arresting the operation. The die may be made round for raising circular elevations at spots upon the surface of the plate. Or it may be made rectangular with straight ridges $7^b$—$7^b$ and a straight groove therebetween for raising a straight path of elevated surface as $6^a$ of Fig. 9.

Figure 12:
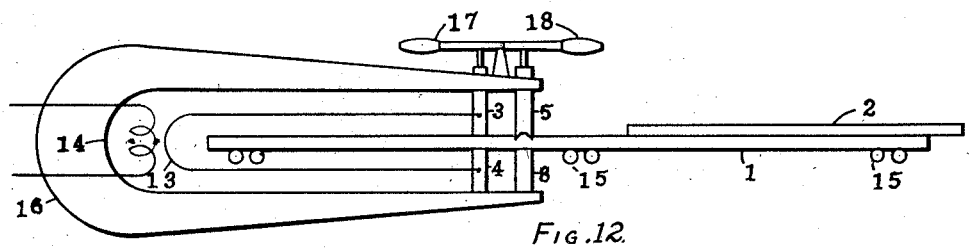
Fig. 12 is a sketch illustrating a machine for performing the operation described in Figs. 1 and 2.

Fig. 12 illustrates a machine which may be used for the first part of the operation, the softening of the spots and the raising therefrom of the elevated surfaces, as well as the final welding. Electric heating current is passed through plate 1 between 3 and 4, the terminals of an electric welding machine, having secondary 13 and primary winding 14. Plate 1 is quickly shifted on rollers 15 so that the heated spot is brought between die 5 and anvil 8, supported by the same yoke 16 which supports terminals 3 and 4. The die 5 is immediately forced down so as to raise from the plate an elevated surface surrounded by a depressed surface. Heating current may now be passed again between terminals 3 and 4 so as to heat and soften another spot and the plate again quickly shifted, etc. Another plate 2 may now be laid upon the prepared edge of plate 1 and the same terminals 3 and 4 applied to form a welded union upon the elevated surfaces and to force the plates into immediate contact as previously described. Levers 17 and 18, respectively, are provided for forcing downward the terminal 3 and the die 5.

Figure 13:
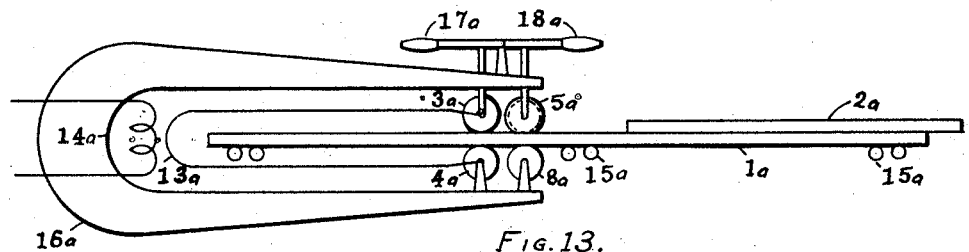
Fig. 13 is a sketch illustrating a machine for performing the operation described in Figs. 3 to 8 inclusive.

Fig. 13 illustrates a machine similar to the one in Fig. 12 but provided with roller terminals $3^a$ and $4^a$ for heating and softening a path of metal in plate $1^a$. A roller die $5^a$ raises an elevated surface from the surface of the softened metal with depressions on either side thereof as described in Figs. 5, 6, 9 and 10. Electric heating current is passed through plate $1^a$ between roller-terminals $3^a$ and $4^a$, as this plate is slowly moved along upon guide rollers $15^a$. As shown, $3^a$ and $4^a$ are the terminals of secondary $13^a$ of an electric welding or heating machine, having primary winding $14^a$ and mounted upon supporting yoke 16ª. The heated path of metal comes immediately under roller-die 5ª which raises from the surface thereof an elevated surface with depressions on either side thereof. Levers 17ª and 18ª are provided for forcing downward electric terminal 3ª and roller-die 5ª, respectively. Another plate 2ª may now be laid upon the prepared edge of plate 1ª and the same roller terminals 3ª and 4ª applied to form a welded union along the path of the elevated surface and to force the plates into immediate contact, as previously described.

The operation is apparent. A portion of one plate is brought between the terminals of an electric heating or welding machine and subjected to pressure and electric heating current. While still hot and soft it is immediately brought beneath a die and pressure applied so as to raise an elevated surface from the plate surface with an adjacent depression or depressions from which the elevated metal was raised. When the desired number of elevated surfaces have been so raised another plate is brought into juxtaposition therewith and the terminals of an electric welding machine are applied to the opposite surfaces of the plates in line with the elevated surfaces. Pressure and welding current are applied so as to fuse the elevated surfaces to the juxtaposed plate and so as to force the elevated material down into the depressions from which it was raised and allow the plates to come into immediate contact.

What I claim is:

1. The method of fastening two metal plates together, face to face, which consists of softening a small portion or portions of one plate by the passage of electric heating current therethrough, of raising from said soft portion or portions an elevated surface or surfaces substantially flat with an adjacent depression or depressions thereabout by forcing a die upon said portion or portions, of bringing into contact with said elevated surface or surfaces the second plate, and by the application of pressure and heating electric current of welding the second plate to the elevated surface or surfaces and forcing the elevated metal into the adjacent depression or depressions from which it was raised so that the plates come into immediate contact.

2. The method of fastening two pieces of metal together, face to face, which consists of heating a small portion of one piece of metal by the passage of electric current therethrough, of raising from said heated portion an elevated surface substantially flat with a depression therebeside by forcing a die upon said portion, of bringing into contact with said elevated surface the other piece of metal, and by the application of pressure and heating electric current of welding the second piece of metal to the elevated surface and forcing the raised metal into the depression so that the pieces of metal come into immediate contact.

3. The method of fastening two pieces of metal together, face to face, which consists of heating a small portion of one piece of metal, of raising from said heated portion an elevated surface with a depression therebeside by forcing a die upon said portion, of bringing into contact with said elevated surface the other piece of metal, and by the application of pressure and heating electric current of welding the second piece of metal to the elevated surface and forcing the raised metal into the depression so that the pieces of metal come into immediate contact.

4. A machine for raising elevated surfaces from the surface of a metal plate, consisting of means for heating portions of the plate and of means for forcing the heated metal upward so as to give the elevated surfaces.

5. A machine for raising elevations upon the surface of a metal plate, consisting of means for softening portions of the plate by the passage of electric heating current therethrough and of means for forcing the heated metal upward at said softened portions so as to give the elevations.

6. A machine for changing the contour of the surface of a piece of metal consisting of means for softening the metal by the passage therethrough of electric heating current and of means for forcing the heated metal to conform to the desired contour, by exerting pressure thereupon, by a die having a face of the desired contour.

In testimony whereof, I have hereunto signed my name in the presence of two subscribing witnesses at Macon in the county of Bibb and State of Georgia this 25th day of October 1919.

CHARLES H. KICKLIGHTER.

Witnesses:
 JAS. K. HOGAN,
 P. G. HOGAN.